United States Patent
Chen

(10) Patent No.: US 8,316,385 B2
(45) Date of Patent: Nov. 20, 2012

(54) DRIVING SYSTEM FOR VIRTUAL WEB CAMERA

(75) Inventor: Chih-Ming Chen, Taipei (TW)

(73) Assignee: Taiwan Colour and Imaging Technology Corporation, Taipei (TW)

( * ) Notice: Subject to any disclaimer, the term of this patent is extended or adjusted under 35 U.S.C. 154(b) by 105 days.

(21) Appl. No.: 13/079,814

(22) Filed: Apr. 5, 2011

(65) Prior Publication Data

US 2012/0257066 A1    Oct. 11, 2012

(51) Int. Cl.
*G06F 3/00*    (2006.01)
(52) U.S. Cl. ........................................ 719/321
(58) Field of Classification Search ............ 719/321
See application file for complete search history.

(56) References Cited

OTHER PUBLICATIONS

Paul Smith, Determing Driver Virual Attention with One Camera, Dec. 2003.*

* cited by examiner

*Primary Examiner* — Lechi Truong
(74) *Attorney, Agent, or Firm* — Lin & Associates IP, Inc.

(57) ABSTRACT

A driving system for virtual web camera enabling several applications to access corresponding virtual web cameras is disclosed. The driving system includes the operations of: linking an upper filter to top of USB Video Class Driver as a driver for the virtual web camera through an upper filter driver mechanism provided by an operating system; executing the upper filter to perform initialization and generate device objects, each corresponding to a real web camera as the virtual web camera and having a specific device name; a file handle for the device object being assigned to the application, which opens the device object and then communicates with the web camera without changing the source code; and releasing the file handle when the file handle is closed at the request of the application such that another application can open and use the device object without interfering with other current applications.

3 Claims, 2 Drawing Sheets

DRIVING SYSTEM FOR VIRTUAL WEB CAMERA

BACKGROUND OF THE INVENTION

1. Field of the Invention

The present invention generally relates to a driving system, and more specifically to a driving system for virtual web camera.

2. The Prior Arts

As video web application becomes more popular, the web camera is more frequently applied to personal computers or portable computing devices. However, the driving system in the prior arts has an issue to access web camera because the video capturing driver in the driver system can support only three applications for web cameras at one time. Furthermore, the real-time messenger system such as Skype using H.264 network protocol for web camera is not supported.

Thus, it is greatly desired to provide a driving system for virtual web camera to support several web cameras to be accessed such that the user can perform the Skype application and simultaneously run the driver of the virtual web camera in the background.

SUMMARY OF THE INVENTION

The primary object of the present invention is to provide a driving system for a virtual web camera. The driving system includes a driving method comprising the steps of: linking an upper filter to top of a universal serial bus (USB) Video Class Driver by an upper filter driver mechanism provided in an operating system, such as Windows OS; executing the upper filter to perform initialization and generate device objects, each having a specific device name; each application for web camera opening a respective device object to acquire a file handle and then communicating with the web camera without changing the source code; and releasing the file handle when the file handle is closed such that another application can open and use the device object without interfering with other applications.

Therefore, the upper filter operating as a driver for virtual web camera can support several web cameras to be accessed such that the user can perform the Skype application and simultaneously run the driver of the virtual web camera in the background. It is more important the driver system of the present invention can acquire the VID/PID (Vendor ID/Product ID) defined in the USB protocol to allow the Skype or other applications to use internal H.264 encoder built in the web camera.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
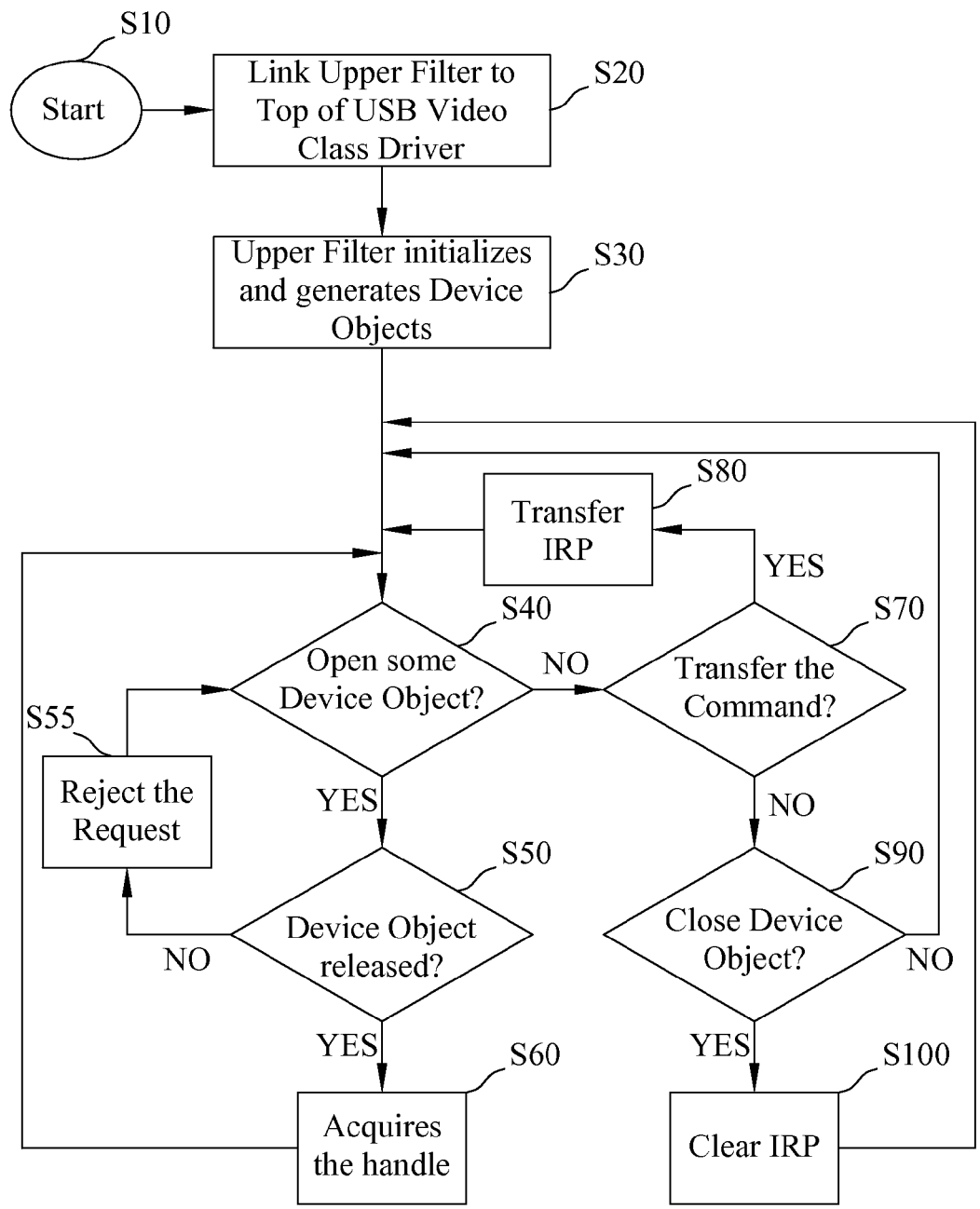
FIG. 1 illustrates the operating flow diagram of the driving system according to the present invention.
Figure 2:
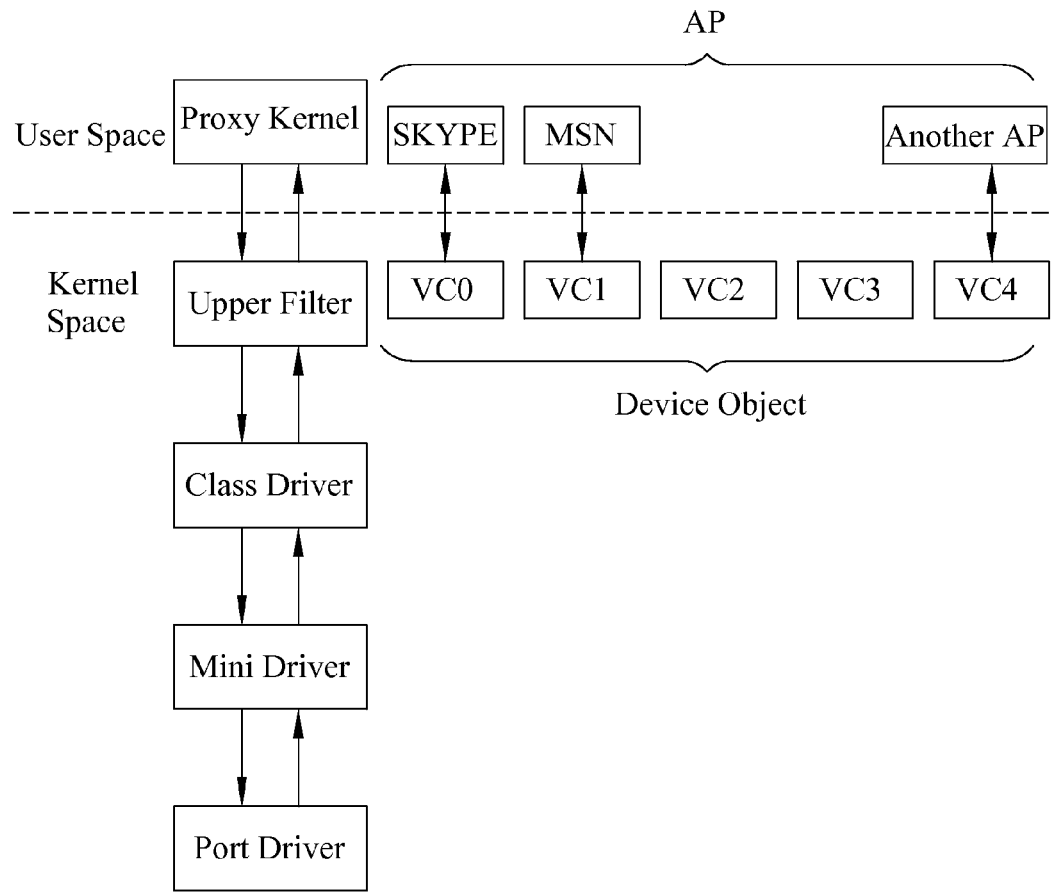
FIG. 2 shows the schematic diagram of the driving system according to the present invention.

Please refer to FIGS. 1 and 2, illustrating the operating flow diagram and showing the schematic diagram of the driving system for virtual web camera according to the present invention, respectively. As shown in FIG. 1, the driving system of the present invention includes the step S10 starting the operation as desired. Then the step S20 proceeds by linking an upper filter to top of USB Video Class Driver by through upper filter driver mechanism provided by an operating system, such as Windows OS by Microsoft Corporation, as shown in FIG. 2. The upper filter is used as a driver for virtual web camera (Virtual Web Cam).

In addition, in FIG. 2, USB Video Class Driver is hooked up on a mini driver stacked on a port driver for USB port. The upper filter, USB Video Class Driver, mini driver and port driver are allocated in kernel space, and the upper filter further communicates with a proxy kernel in user space.

The step S30 is then performed, and the upper filter initializes to generate a plurality of device objects, such as the zeroth, first, second, third and fourth device objects, VC0, VC1, VC2, VC3 and VC4 in FIG. 2. Each device object has a specific device name and corresponds to a real web camera as the virtual web camera mentioned above. It should be noted that 5 device objects shown in FIG. 2 is only an example to illustrate the aspects of the present invention for clarity, and not intended to limit the scope of the invention.

Subsequently, the step S40 proceeds to determine if any application (AP) intends to open one of the device objects, such as the zeroth, first, second, third and fourth device objects, VC0, VC1, VC2, VC3 and VC4. If the AP intends to open the device object, then the step S50 is performed. The step S70 proceeds if the AP does not intend to open the device object.

In the step S50, determine if the device object which is intended to open in the step S40 is previously released. If the device object is not released, then enter into the step S55 to reject the request of opening the device object, and then return to step S40. If the device object is released, the step S60 proceeds to enable the AP to acquire the file handle corresponding to device object, and then return to step S40t. For example, the Skype opens the zeroth device object VC0, the MSN provided by Microsoft opens the first device object VC1, and another AP opens the fourth device object VC4, and each device object acquires the file handle, respectively, as shown in FIG. 2.

In the step S70, determine if the AP intends to transfer a command. If no command is intended to transfer, then enter into the step S90. If the command is intended to transfer, the step S80 proceeds to transfer IRP (I/O Request Packet) and return to the step S40. In the step S90, determine if the AP intends to close the device object. If the AP intends to close the device object, then the step S100 is performed to release the handle of the device object, clear the corresponding IRP, and return to the step S40. If the device object is not intended to close, return to the step S40.

The aspect of the present invention is to support several web cameras to be accessed such that the user can perform the driver for the virtual web camera in the background while the AP (such as Skype) is running. Particularly, the driving system of the present invention can access the VID/PID to allow the internal H.264 encoder built in the web camera to be used by other application. Moreover, the scheme developed by the present invention can allow another AP to acquire the handle of the device object previously released, so no interference would happen to impact other applications.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for driving a virtual web camera, comprising the steps of:
   (a) starting;
   (b) linking an upper filter to top of a universal serial bus (USB) Video Class Driver as a driver for said virtual web camera;
   (c) executing said upper filter to perform initialization and generate a plurality of device objects, each corresponding to a real web camera as said virtual web camera and having a specific device name;
   (d) determining if an application (AP) intends to open one of said device objects, and entering into step (e) if said AP intends to open one of said device objects, or entering into step (g) if said AP does not intend to open one of said device objects;
   (e) determining if the device object to be opened is released previously, and rejecting opening said device object and returning to said step (d) if said device object is not released, or executing step (f) if said device object is released;
   (f) acquiring a file handle corresponding to said device object and returning to said step (d);
   (g) determining if said AP intends to transfer a command, and entering into step (i) if no command is intended to transfer, or entering into step (h) if said command is intended to transfer;
   (h) issuing an IRP(I/O Request Packet) and returning to said step (d);
   (i) determining if said AP intends to close said device object, and entering into step (j) if said device object is intended to be closed, or returning to said step (d) if said device object is not intended to be closed; and
   (j) releasing said file handle of said device object, clearing said IRP, and returning to said step (d);
   wherein said USB Video Class Driver is hooked up on a mini driver which is built on a port driver, said upper filter, said USB Video Class Driver, said mini driver and said port driver are allocated in kernel space, and said upper filter further communicates with a proxy kernel in user space.

2. The method as claimed in claim 1, wherein said upper filter is linked to said top of said USB Video Class Driver by an upper filter driver mechanism provided by an operating system.

3. The method as claimed in claim 2, wherein said operating system comprises a Windows operating system.

* * * * *